US012747848B2

(12) United States Patent
Van Delden et al.

(10) Patent No.: US 12,747,848 B2
(45) Date of Patent: Sep. 29, 2026

(54) LIGHT EXIT WINDOW HAVING ADJUSTABLE CONTRAST SENSITIVITY

(71) Applicant: SIGNIFY HOLDING B.V., Eindhoven (NL)

(72) Inventors: Martinus Hermanus Wilhelmus Maria Van Delden, Venlo (NL); Peter Johannes Martinus Bukkems, Deurne (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 114 days.

(21) Appl. No.: 18/868,822

(22) PCT Filed: May 22, 2023

(86) PCT No.: PCT/EP2023/063606
§ 371 (c)(1),
(2) Date: Nov. 25, 2024

(87) PCT Pub. No.: WO2023/232530
PCT Pub. Date: Dec. 7, 2023

(65) Prior Publication Data
US 2026/0194208 A1 Jul. 9, 2026

(30) Foreign Application Priority Data
May 31, 2022 (EP) .................................... 22176510

(51) Int. Cl.
*F21V 7/04* (2006.01)
*F21S 8/00* (2006.01)
(Continued)

(52) U.S. Cl.
CPC ................ *F21V 7/04* (2013.01); *F21S 8/033* (2013.01); *F21S 8/04* (2013.01); *F21V 7/0016* (2013.01);
(Continued)

(58) Field of Classification Search
CPC ........ F21V 7/04; F21V 7/0008; F21V 7/0016; F21V 7/043; F21V 7/046; F21V 7/06;
(Continued)

(56) References Cited

U.S. PATENT DOCUMENTS

| | | | | |
|---|---|---|---|---|
| 2,284,194 A * | 5/1942 | Gangbin | F21V 7/0008 362/151 |
| 4,974,137 A | 11/1990 | Evans, Jr. et al. | |

(Continued)

FOREIGN PATENT DOCUMENTS

| | | |
|---|---|---|
| DE | 29710475 U1 | 8/1997 |
| DE | 19609262 A1 | 9/1997 |

(Continued)

*Primary Examiner* — Erin Kryukova

(57) ABSTRACT

The invention provides a light generating system (1000) comprising a first light generating device (110) and a unit (1100), wherein: (a) the first light generating device (110) is configured to provide first device light (111) having a wavelength in the visible wavelength range; (b) the unit (1100) comprises in cross-sectional view an open hollow part (400) and a closed hollow part (500); wherein the unit (1100) comprises a viewer side (1101); wherein relative to the viewer side (1101), the open hollow part (400) is concave; (c) the open hollow part (400) comprises a first wall part (451); wherein the first wall part (451) is diffuse reflective for the first device light (111); (d) the closed hollow part (500) comprises a chamber wall (501) comprising (a) a second wall part (452), wherein the second wall part (452) is translucent for the first device light (111), and (b) a chamber wall part (453), wherein the chamber wall part (453) is diffuse reflective for the first device light (111); (e) the unit (1100) comprises a wall element (450) comprising the first wall part (451) and the second wall part (452); (f) the first light generating device (110) is configured in the open hollow part (400); wherein the first light generating device (110) is configured to irradiate (i) at least part of the
(Continued)

first wall part (451) and (ii) at least part of the second wall part (452); and (g) the unit (1100) and the first light generating device (110) are configured such that first device light (111) does not directly escape from the viewer side (1101); and wherein the closed hollow part (500) is configured such that at least part of the first device light (111) entering the closed hollow.

15 Claims, 3 Drawing Sheets

(51) Int. Cl.

| | |
|---|---|
| ***F21S 8/04*** | (2006.01) |
| ***F21V 7/00*** | (2006.01) |
| ***F21Y 113/10*** | (2016.01) |
| ***F21Y 115/10*** | (2016.01) |

(52) U.S. Cl.
CPC ........ *F21Y 2113/10* (2016.08); *F21Y 2115/10* (2016.08)

(58) Field of Classification Search
CPC ..... F21V 7/08; F21V 7/07; F21V 7/09; F21V 7/0041; F21S 8/033; F21S 8/04; F21S 6/008; F21S 8/037; F21Y 2113/10; F21Y 2115/10; F21Y 2113/20; F21Y 2107/70; F21Y 2107/90
See application file for complete search history.

(56) References Cited

U.S. PATENT DOCUMENTS

| | | | | |
|---|---|---|---|---|
| 7,556,399 | B1 * | 7/2009 | Bailey ................... | F21V 7/0016 362/225 |
| 2014/0268721 | A1 * | 9/2014 | Durkee ..................... | F21V 5/08 362/218 |
| 2017/0051893 | A1 | 2/2017 | Di Trapani | |
| 2019/0086057 | A1 | 3/2019 | Kim | |

FOREIGN PATENT DOCUMENTS

| | | | | | |
|---|---|---|---|---|---|
| DE | 10112055 | A1 * | 10/2002 | ............ | F21V 7/0025 |
| KR | 20110025821 | A * | 3/2011 | .............. | F21V 13/10 |

* cited by examiner

LIGHT EXIT WINDOW HAVING ADJUSTABLE CONTRAST SENSITIVITY

CROSS-REFERENCE TO PRIOR APPLICATIONS

This application is the U.S. National Phase application under 35 U.S.C. § 371 of International Application No. PCT/EP2023/063606, filed on May 22, 2023, which claims the benefit of European Patent application Ser. No. 22/176,510.0, filed on May 31, 2022. These applications are hereby incorporated by reference herein.

FIELD OF THE INVENTION

The invention relates to a light generating system as well as to a lighting device comprising such light generating system. The invention also relates to a space comprising such light generating system. The invention further relates to a method for manufacturing such light generating system.

BACKGROUND OF THE INVENTION

Lighting systems which simulate natural lighting, specifically sunlight illumination, are known in the art. US2017051893, for instance, describes a lighting system, comprising: a light source for providing a light beam of directed non-diffused light with a first correlated color temperature along a main light beam direction, wherein a propagation direction of the directed non-diffused light is modified across the light beam and is essentially parallel to the main light beam direction in an inner area and is increasingly inclined with respect to the main light beam direction with increasing distance from the inner area; and a lamp shade-like structure comprising a bottom unit to be illuminated from the light source at one side and a screen structure provided at another side, the bottom unit and the screen structure defining a light passage, wherein: the bottom unit comprises a diffused light generator for generating diffused light at a second correlated color temperature, which is larger than the first correlated color temperature; the bottom unit is at least partially transparent for the directed non-diffused light of the light beam; the bottom unit is configured such that at least a divergent light beam portion of the light beam enters the light passage; and the screen structure is spatially oriented with respect to the main light beam direction of the divergent light beam portion to be illuminated by at least a part of the divergent light beam portion, thereby providing an illuminated screen section acting as a scattered light source.

SUMMARY OF THE INVENTION

There appears to be a desire for large luminous surfaces having a low contrast modulation due to the absence of disturbing optical seams. Contrast sensitivity is the ability to detect subtle differences in shading and patterns. It appears desirable for certain applications, like when using large luminous surfaces, to detect objects without clear outlines and discriminate objects or details from their background. In lighting, contrast sensitivity is a measure for the level of discomfort arising from the repetitive and alternating occurrence of a bright lit surface of a given size, and an often darker and smaller sized seam. The alternating repetition of a bright(er) and a less bright portions is called a cycle. The number of cycles per degree of viewing angle is called the spatial frequency. The most disturbing spatial frequencies appear to be in the range of about 2-4 cycles/degree. One of the challenges associated with large and very large luminous surfaces is their sheer size. As may be understood, size inherently complicates tooling, handling, moment and stiffness of the frame members building the optical mixing box, crating, transport, and on-site installation including lifting and hoisting of the assembled luminary, for example. Strikingly, most of these challenges inherently arise from the customer's desire for seamless optical surfaces. Thus there is a need for alternative means to reduce the contrast sensitivity.

Known means and methods to reduce the contrast modulation or sensitivity to acceptable levels comprise of increasing the area of the brighter and/or less bright surfaces, or dimming of the luminous flux of the light exit window, or increasing the reflectivity of the less bright optical seams.

To move away from dull spaces, different architectural ceilings have been developed. Many of the proposed designs, however, still integrate traditional lighting devices with contemporary ceiling architectures, such that the challenges in contrast sensitivity remain to persist. For instance, a ceiling may be constructed from large, modular, S-shaped concrete elements that overlap to build a portion of an open optical cavity, i.e. curved cove light. Because of their sheer size, and the observes distance to the ceiling, the contrast sensitivity of such ceiling may favorably improve towards lower spatial frequencies.

However, also such type of ceilings may come with a series of drawbacks. Firstly, the lower portion of the overlapping S-shaped elements may be open, thus the optical efficiency of the cove light is low. Secondly, the ceiling may still suffer from contrast sensitivity. Moreover, the level of contrast modulation may be observation direction dependent. Thirdly, the dimensions of the S-shaped structure cannot be downscaled without penalty. The contrast sensitivity of a structure may depend on its spatial frequencies. So, when the distance to the ceiling is decreased to office standards, and the size of the S-shape scaled to match that of an office ceiling grid, the worst possible modulation of 2-4 cycles/degree appear to result. However, downscaling of for example the S-shape may be required because of the available recess depth, or space behind the ceiling. This space frequently accommodates infrastructural components such as airducts, heating systems, sprinklers and pipes, airshafts, etc. etc.

Thus there is also a need to drastically improve upon the (down)scaling of the design, the size dependent contrast sensitivity, and the optical efficiency of the indirect lit cavity. Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

According to a first aspect, the invention provides a light generating system comprising a first light generating device and a unit. Especially, the first light generating device may be configured to provide first device light having a wavelength in the visible wavelength range. Further, in embodiments the unit may comprise in cross-sectional view an open hollow part and a closed hollow part. Especially, the unit may comprise a viewer side. Relative to the viewer side, the open hollow part may be concave. Further, in embodiments the open hollow part may comprise a first wall part. Especially, the first wall part may be diffuse reflective for the first device light. In embodiments, the closed hollow part may comprise a chamber wall comprising (a) a second wall part, and (b) a chamber wall part. Especially, the second wall part may be translucent for the first device light. Further, in embodiments the chamber wall part may be diffuse reflective for the first device light. In specific embodiments, the unit may comprise a wall element comprising the first wall part and the second wall part. In specific embodiments, the first light generating device may be configured in the open hollow part. The first light generating device may in embodiments be configured to irradiate (i) at least part of the first wall part and (ii) at least part of the second wall part. Further, in embodiments the unit and the first light generating device may be configured such that first device light does (substantially) not directly escape from the viewer side. Yet, in embodiments the closed hollow part may be configured such that at least part of the first device light entering the closed hollow part via the second wall part also escapes via the second wall part. Hence, in embodiments the invention provides a light generating system comprising a first light generating device and a unit, wherein: (a) the first light generating device is configured to provide first device light having a wavelength in the visible wavelength range; (b) the unit comprises in cross-sectional view an open hollow part and a closed hollow part; wherein the unit comprises a viewer side; wherein relative to the viewer side, the open hollow part is concave; (c) the open hollow part comprises a first wall part; wherein the first wall part is diffuse reflective for the first device light; (d) the closed hollow part comprises a chamber wall comprising (i) a second wall part, wherein the second wall part is translucent for the first device light, and (ii) a chamber wall part, wherein the chamber wall part is diffuse reflective for the first device light; (e) the unit comprises a wall element comprising the first wall part and the second wall part; (f) the first light generating device is configured in the open hollow part; wherein the first light generating device is configured to irradiate (i) at least part of the first wall part and (ii) at least part of the second wall part; and (g) the unit and the first light generating device are configured such that first device light does (substantially) not directly escape from the viewer side. Especially, the closed hollow part may be configured such that at least part of the first device light entering the closed hollow part via the second wall part also escapes via the second wall part.

With such system, scalability may be possible, both in the direction of upscaling and in the direction of downscaling. Further contrast sensitivity may be reduced. It may also be possible in embodiments to control the light distribution over the wall element. Further, by controlling shape and texture, different optical effects may be created.

As can be derived from the above, the light generating system may comprise a light generating device.

A light generating device may especially be configured to generate device light. Especially, the light generating device may comprise a light source. The light source may especially be configured to generate light source light. In embodiments, the device light may essentially consist of the device light. In other embodiments, the device light may essentially consist of converted light source light. In yet other embodiments, the device light may comprise (unconverted) light source light and converted light source light. Light source light may be converted with a luminescent material into luminescent material light and/or with an upconverter into upconverted light (see also below). The term "light generating device" may also refer to a plurality of light generating devices which may provide device light having essentially the same spectral power distributions. In specific embodiments, the term "light generating device" may also refer to a plurality of light generating devices which may provide device light having different spectral power distributions (see further also below).

The term "light source" may in principle relate to any light source known in the art. It may be a conventional (tungsten) light bulb, a low pressure mercury lamp, a high pressure mercury lamp, a fluorescent lamp, an LED (light emissive diode). In a specific embodiment, the light source comprises a solid state LED light source (such as an LED or laser diode (or "diode laser")). The term "light source" may also relate to a plurality of light sources, such as 2-2000 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module.

The light source may have a light escape surface. Referring to conventional light sources such as light bulbs or fluorescent lamps, it may be an outer surface of a glass or a quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" or "light generating device" may refer to a semiconductor light-emitting device, such as a light emitting diode (LEDs), a resonant cavity light emitting diode (RCLED), a vertical cavity laser diode (VCSELs), an edge emitting laser, etc. . . . The term "light source" may also refer to an organic light-emitting diode (OLED), such as a passive-matrix (PMOLED) or an active-matrix (AMOLED). In a specific embodiment, the light source comprises a solid-state light source (such as an LED or laser diode). In an embodiment, the light source comprises an LED (light emitting diode). The terms "light source" or "solid state light source" may also refer to a superluminescent diode (SLED).

The term LED may also refer to a plurality of LEDs.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as an LED, or downstream of a plurality of solid-state light sources (i.e. e.g. shared by multiple LEDs). In embodiments, the light source may comprise an LED with on-chip optics. In embodiments, the light source comprises pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation.

Secondary radiation may be based on conversion by a luminescent material. The secondary radiation may therefore also be indicated as luminescent material radiation. The luminescent material may in embodiments be comprised by the light source, such as an LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as an LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape,) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The term "light source" may (thus) in embodiments also refer to a light source that is (also) based on conversion of light, such as a light source in combination with a luminescent converter material. Hence, the term "light source" may also refer to a combination of an LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like an LED, and an optical filter, which may change the spectral power distribution of the light generated by the light source. Especially, the term "light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

As indicated above, the light generating system may comprise a first light generating device. The term "first light generating device" may also refer to a plurality of substantially identical first light generating devices, like a plurality of identical light generating devices (such as from the same bin), or a plurality of light generating devices essentially having the same function. Herein, in embodiments a function of the first light generating device(s) is to irradiate (i) at least part of the first wall part and (ii) at least part of the second wall part (see further also below). Further, in embodiments the first light generating device may be configured to provide first device light having a wavelength in the visible wavelength range. However, there may also be a plurality of first light generating devices of which (i) one or more are configured to generate visible light and of which (ii) one or more are configured to generate IR radiation and/or one or more are configured to generate UV radiation.

The terms "visible", "visible light" or "visible emission" and similar terms refer to light having one or more wavelengths in the range of about 380-780 nm.

Herein, UV may especially refer to a wavelength selected from the range of 190-380 nm, such as 200-380 nm. Herein, UV (ultraviolet) may especially refer to a wavelength selected from the range of 190-380 nm, though in specific embodiments other wavelengths may also be possible.

Herein, IR (infrared) may especially refer to radiation having a wavelength selected from the range of 780-3000 nm, such as 780-2000 nm, e.g. a wavelength up to about 1500 nm, like a wavelength of at least 900 nm, though in specific embodiments other wavelengths may also be possible. Hence, the term IR may herein refer to one or more of near infrared (NIR (or IR-A)) and short-wavelength infrared (SWIR (or IR-B)), especially NIR.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The terms "violet light" or "violet emission", and similar terms, may especially relate to light having a wavelength in the range of about 380-440 nm. In specific embodiments, the violet light may have a centroid wavelength in the 380-440 nm range. The terms "blue light" or "blue emission", and similar terms, may especially relate to light having a wavelength in the range of about 440-490 nm (including some violet and cyan hues). In specific embodiments, the blue light may have a centroid wavelength in the 440-490 nm range. The terms "green light" or "green emission", and similar terms, may especially relate to light having a wavelength in the range of about 490-560 nm. In specific embodiments, the green light may have a centroid wavelength in the 490-560 nm range. The terms "yellow light" or "yellow emission", and similar terms, may especially relate to light having a wavelength in the range of about 560-590 nm. In specific embodiments, the yellow light may have a centroid wavelength in the 560-590 nm range. The terms "orange light" or "orange emission", and similar terms, may especially relate to light having a wavelength in the range of about 590-620 nm. In specific embodiments, the orange light may have a centroid wavelength in the 590-620 nm range. The terms "red light" or "red emission", and similar terms, may especially relate to light having a wavelength in the range of about 620-750 nm. In specific embodiments, the red light may have a centroid wavelength in the 620-750 nm range. The terms "cyan light" or "cyan emission", and similar terms, especially relate to light having a wavelength in the range of about 490-520 nm. In specific embodiments, the cyan light may have a centroid wavelength in the 490-520 nm range. The terms "amber light" or "amber emission", and similar terms, may especially relate to light having a wavelength in the range of about 585-605 nm, such as about 590-600 nm. In specific embodiments, the amber light may have a centroid wavelength in the 585-605 nm range. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

Further, the light generating system may comprise a unit. In use, a plurality of light generating system may be applied, and/or a light generating system comprising a plurality of units may be applied. Hence, the unit may be configured such that it is a modular unit and multiples thereof may be arrangeable in a grid. Such unit may be open at one or more side or may be closed at one or more side, especially open at one or more sides. However, seen from a viewer side the unit may have a substantially closed wall which may be shaped such, that it provides an open cavity and that it is also part of an open cavity. Therefore, in embodiments the unit may be a modular unit.

In general, the unit may have a part that protrudes from a plane through a central point of the unit, which part may hide a closed cavity, and a part that is recessed relative to such plane, and which part provides an open part. The former part may be convex and the latter part may be concave.

Hence, in embodiments the unit may comprise—in cross-sectional view—an open hollow part and a closed hollow part. Further, the unit may comprise a viewer side. Especially, the unit may have a viewer side and a back side. Assuming e.g. an application in a ceiling, the viewer side may be directed to the floor and the back side may be directed to the ceiling. Assuming application on a wall, the viewer side may be directed away from the wall, and the back side may be directed to the wall. Assuming an application in a (free) standing unit, the backside may be closed such that the remainder of the unit may be visible from that side, and (system) light may essentially only escape from the viewer side. Therefore, in embodiments, relative to the viewer side, the open hollow part is concave.

In specific embodiments, the open hollow part may comprise a first wall part. In specific embodiments, in a cross-sectional view, the open hollow part may essentially be defined by the first wall part.

In further specific embodiments, the first wall part may be diffuse reflective for the first device light. In this way, light reaching the open hollow part may be diffusively reflected by the first wall part. As indicated above, the open hollow part may especially at least partially be defined by the first wall part.

The closed hollow part, which may in cross-sectional view essentially be closed, may define a chamber, i.e. the hollow part. The chamber may be defined by a chamber wall.

This chamber wall may comprise a second wall part, especially configured at the viewer side, which may in embodiments, together with the first wall part, a wall element (see also below). This second wall part may allow some transmission of light within the chamber to the external of the chamber via the second wall part, or vice versa. Hence, in embodiments the closed hollow part may comprises a chamber wall comprising (a) a second wall part. Especially, the second wall part may be translucent for the first device light. With a translucent second wall part, light may be transmitted, whereas the internal of the chamber may not be visible to a human at the viewer side.

The chamber wall may also comprise a chamber wall part, especially configured at the back side, which may especially be configured not to transmit too much light that is available in the chamber. In this way, light within the chamber may essentially only escape from the chamber via the second wall part, and not via the chamber wall part. Further, in specific embodiments the chamber wall may comprise (b) a chamber wall part. Especially, the chamber wall part may be diffuse reflective for the first device light.

As can be derived from the above, the unit may comprise a wall element comprising the first wall part and the second wall part. Assuming a cross-sectional plane of the unit, an area of the first wall part and the second wall part (at the viewer side) may be larger than an area of the cross-sectional plane (see also below for embodiments). Especially, the wall element may be translucent (for the first device light).

The open hollow part may be used to host a light generating device. The light generating device may be configured to irradiate at least part of the first wall part and part of the second wall part. The light generating device may especially be configured such and the open hollow part may be shaped such, that the light generating device may be hidden in the open hollow part. In this way, device light may only escape from the open hollow part via at least one reflection at the first wall part and/or at least one reflection at the second wall part. Hence, in embodiments the unit and the first light generating device may be configured such that first device light does (substantially) not directly escape from the viewer side. The light generation device configured in the hollow part is herein indicated as first light generating device. As indicated above, the first light generating device may comprise one or more light generating devices. Assuming a plurality of first light generating devices, two or more may be the same and/or two or more may be different. Hence, in embodiments the first light generating device may configured in the open hollow part, and especially the first light generating device may be configured to irradiate (i) at least part of the first wall part and (ii) at least part of the second wall part.

As the second wall part may be translucent, at least part of the first device light may enter the closed hollow part.

However, as the second wall part may thus be translucent, at least part of the first device light may also again escape from the closed hollow part. In this respect, it may also be useful when the chamber wall part is reflective. In this way, light that has entered the chamber may be reflected at the chamber part, and e.g. be directed to the second wall part, through which it may escape from the chamber. Further, in embodiments the closed hollow part may be configured such that at least part of the first device light entering the closed hollow part via the second wall part also escapes via the second wall part.

In embodiments, the wall element may have a wave-like shape. In embodiments, the wall element may have a sine-like shape. Hence, the wall element may comprise a concave part and a convex part. The wall element may consist of multiple curves but the wall element may also comprise one or more facets. In embodiments, mutual angles between adjacent facets may be larger than 90°, such as selected from the range of 95-175°, like e.g. 100-135°, though other values may also be possible.

In specific embodiments, the first wall part may be curved, or may comprise more than three facets, such as at least four facets, or at least five facets, or may comprise a curved part and one or more facets. Alternatively or additionally, the second wall part may be curved, or may comprise more than three facets, or may comprise a curved part and one or more facets.

In embodiments, at least 50%, such as at least 60%, like especially at least 70% of the surface of the wall element may be defined by the first wall part and the second wall part.

Especially, in embodiments the first light generating device may be controllable. More especially, the first device light may be controllable with respect to one or more of color point and radiant flux.

The color point may e.g. be controllable by using first light generating devices having different spectral power distributions for their first light, like e.g. first light generating devices of different bins. Alternatively or additionally, the color point may also be tunable when using a light generating device having a tunable spectral power distribution, such as a VCSEL or superluminescent dye. Other options to control the spectral power distribution of the first device light may also be possible.

The radiant flux may be controllable by controlling the power to the light generating device. In embodiments, the radiant flux may be controlled via pulse-width modulation. Other options to control the radiant flux of the first device light may also be possible.

In embodiments, the light generating system further may comprise a control system configured to control the first light generating device.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a smartphone or an iPhone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Thread, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

First device light generated in the cavity may especially be reflected by the first wall part. Hence, the first wall part may be reflective for the first device light. In embodiments, the first wall part, assuming perpendicular irradiation with the first device light, may be configured to reflect at least 25% of the first device light. In specific embodiments, the first wall part, assuming perpendicular irradiation with the first device light, may be configured to reflect at least 35% of the first device light. Yet, in embodiments, the first wall part, assuming perpendicular irradiation with the first device light, may be configured to reflect at least 45% of the first device light, such as at least 55%, like more especially at least 65%, even more especially at least 75%, such as at least about 80% or higher, such as at least 90%. Would the first wall part be translucent, for a higher reflection a (specular) reflector downstream of the first wall part may be configured.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In embodiments, the second wall part, assuming perpendicular irradiation with the first device light, may be configured to forward transmit at least 25% of the first device light, more especially at least about 35%, like at least about 45%. In specific embodiments, the second wall part, assuming perpendicular irradiation with the first device light, may be configured to forward transmit at least 55% of the first device light. More especially, in embodiments the second wall part, assuming perpendicular irradiation with the first device light, may be configured to forward transmit 60-95% of the first device light.

The chamber wall part may be reflective as well for the first device light. The chamber wall part may be reflective for the first device light. In embodiments, the chamber wall part, assuming perpendicular irradiation with the first device light, may be configured to reflect at least 25% of the first device light. In specific embodiments, the chamber wall part, assuming perpendicular irradiation with the first device light, may be configured to reflect at least 35% of the first device light. Yet, in embodiments, the chamber wall part, assuming perpendicular irradiation with the first device light, may be configured to reflect at least 45% of the first device light, such as at least 55%, like more especially at least 65%, even more especially at least 75%, such as at least about 80% or higher, such as at least about 90%.

Would the chamber wall part be translucent, for a higher reflection a (specular) reflector downstream of the chamber wall part may be configured. In specific embodiments, the chamber wall part, assuming perpendicular irradiation with the first device light, may be configured to reflect at least 90% of the first device light, such as at least about 95%.

With such system, part of the first device light may escape from the open hollow part, and part of the first device light may escape from the closed hollow part, after the first device light has first entered the closed hollow part. In this way, a light emitting wall element. Hence, seen from the viewer side, the unit may provide light from a substantial part of the wall element. Contrast may be relatively low.

Contrast may further be controlled by including a second light generating device, which is configured to provide second device light in the closed hollow part. Alternatively or additionally, the second light generating device may also be used for other purposes, such as to provide another color of light, or even to enhance contrast.

In embodiments, on operation, the color points and radiant flux of the light emanating from the unit from the first wall part and from the second wall part may be the same, but may in other embodiments also be different.

Hence, in specific embodiments the light generating system may further comprise a second light generating device configured to provide second device light in the closed hollow part.

As indicated above, the light generating system may comprise a second light generating device. The term "second light generating device" may also refer to a plurality of substantially identical second light generating devices, like a plurality of identical light generating devices (such as from the same bin), or a plurality of light generating devices essentially having the same function. Herein, in in embodiments the second light generating device may be configured to provide second device light having a wavelength in the visible wavelength range. However, there may also be a plurality of second light generating devices of which (i) one or more are configured to generate visible light and of which (ii) one or more are configured to generate IR radiation and/or one or more are configured to generate UV radiation. Especially, in embodiments the second light generating device may be controllable. More especially, the second device light may be controllable with respect to one or more of color point and radiant flux. The color point may e.g. be controllable by using second light generating devices having different spectral power distributions for their second light, like e.g. second light generating devices of different bins. Alternatively or additionally, the color point may also be tunable when using a light generating device having a tunable spectral power distribution, such as a VCSEL or superluminescent dye. Other options to control the spectral power distribution of the second device light may also be possible. The radiant flux may be controllable by controlling the power to the light generating device. In embodiments, the radiant flux may be controlled via pulse-width modulation. Other options to control the radiant flux of the second device light may also be possible. In embodiments, the control system may be configured to control the second light generating device.

Especially, in embodiments the second device light has a wavelength in the visible wavelength range. Yet, in further embodiments, wherein the system comprises a plurality of second light generating devices, at least one of the second light generating devices is configured to generate second device light having a wavelength in the visible wavelength range.

The second light generating device may be configured upstream of the chamber wall part. In such embodiments, the chamber wall part is at least transmissive for the second device light. Alternatively or additionally, the second light generating device may be configured within the closed hollow part. In such embodiments, the chamber wall part is at least reflective for the second device light. Hence, in embodiments the second light generating device may be configured within the closed hollow part. Therefore, in specific embodiments no second device light may escape from the system other than via the second wall part.

In order to allow the second device light to escape from the closed hollow part, the second wall part may (also) be transmissive for the second device light. Further, to promote escape from the second device light from the closed hollow part, the chamber wall part may be reflective, especially diffuse reflective. Therefore, in embodiments the chamber wall part may be diffuse reflective for the second device light. Hence, in embodiment the chamber wall part may be (i) essentially not transmissive for the second device light, and (ii) reflective for the second device light, especially when the second light generating device is configured in the closed hollow part. In other embodiments, the chamber wall part may be (i) transmissive for the second device light, and (ii) reflective for the second device light, especially when the second light generating device is configured at the backside of the chamber wall part (and thus external of the closed hollow part).

Especially, the second wall part may be translucent for the second device light. As indicated above, the second wall part may also be translucent for the first device light. In specific embodiments, the second wall part may be translucent for white light. Yet, in further specific embodiments, the entire wall element may be translucent for white light.

In specific embodiments, the unit and the second light generating device may be configured such that second light generating device in the off-state may be not visible with the human eye for a human user from the viewer side (assuming the second light generating device is configured within the closed hollow part). Therefore, in embodiments the translucency may be selected such that second device light (and first device light) may be transmitted through the second wall part, whereas the forward transmission is low enough to essentially conceal the second light generating device.

In embodiments, the second wall part, assuming perpendicular irradiation with the second device light, may be configured to forward transmit 60-95% of the second device light, such as 65-90%, like selected from the range of 70-90%.

Likewise, as can also be derived from the above, the second wall part, assuming perpendicular irradiation with the first device light (either of first device light entering the closed hollow part or of first device light escaping (again) from the closed hollow part), may be configured to forward transmit 60-95% of the first device light, such as 65-90%, like selected from the range of 70-90%.

As indicated above, in embodiments the chamber wall part may be (i) essentially not transmissive for the second device light, and (ii) reflective for the second device light, especially when the second light generating device is configured in the closed hollow part. In embodiments, the chamber wall part, assuming perpendicular irradiation with the second device light, may be configured to reflect at least 25% of the second device light. In specific embodiments, the chamber wall part, assuming perpendicular irradiation with the second device light, may be configured to reflect at least 35% of the second device light. Yet, in embodiments, the chamber wall part, assuming perpendicular irradiation with the second device light, may be configured to reflect at least 45% of the second device light, such as at least 55%, like more especially at least 65%, even more especially at least 75%, such as at least about 80% or higher. Would the chamber wall part be translucent, for a higher reflection a (specular) reflector downstream of the chamber wall part may be configured. In specific embodiments, the chamber wall part, assuming perpendicular irradiation with the second device light, may be configured to reflect at least 90% of the second device light, such as at least about 95%.

In specific embodiments, the second light generating device may be controllable. More especially, the second device light may be controllable with respect to one or more of color point and radiant flux. Hence, in embodiments the control system may be configured to control the second light generating device. In specific embodiments, the control system may be configured to control the first light generating device and second light generating device individually.

When there are more than one cavities for the first light generating devices, respectively, these may be controlled individually, in embodiments. When there are more than one cavities for the second light generating devices, respectively, these may be controlled individually, in embodiments.

The color point may e.g. be controllable by using second light generating devices having different spectral power distributions for their second light, like e.g. second light generating devices of different bins. Alternatively or additionally, the color point may also be tunable when using a light generating device having a tunable spectral power distribution, such as a VCSEL or superluminescent dye. Other options to control the spectral power distribution of the second device light may also be possible.

The radiant flux may be controllable by controlling the power to the light generating device. In embodiments, the radiant flux may be controlled via pulse-width modulation. Other options to control the radiant flux of the second device light may also be possible.

It appears that with the first and the second light generating device, a scalable unit may be provided which may provide a light emitting surface, where contrast can substantially be reduced. The radiant fluxes and the color points of the first device light and of the second device light, may be chosen such that a substantially continuous and evenly distributed light emitting surface is obtained, i.e. light from the wall element. Hence, when controlling one or more of the first light generating device and the second light generating device, such low contrast may be obtained. However, it may also be possible to enhance contrast, when desired. Further, when the correlated color temperature and/or the color point are variable, all kinds of lighting schemes may be chosen.

In embodiments, in an operational mode of the system, the color point of the first device light and of the second device light may essentially be the same, like both white light (or both colored light). Colors or color points of a first type of light and a second type of light may be essentially the same when the respective color points of the first type of light and the second type of light differ with at maximum 0.03 for u' and/or with at maximum 0.03 for v', even more especially at maximum 0.02 for u' and/or with at maximum 0.02 for v'. In yet more specific embodiments, the respective color points of first type of light and the second type of light may differ with at maximum 0.01 for u' and/or with at maximum 0.01 for v'. Here, u' and v' are color coordinate of the light in the CIE 1976 UCS (uniform chromaticity scale) diagram. Hence, in specific embodiments the light generating system may be configured to provide in an operational mode of the light generating system first device light and second device light having color points that differ at maximum 0.03 for u' and/or at maximum 0.03 for v'.

In specific embodiments, the first light generating device may be configured to generate (in an operational mode of the first light generating device) white first device light having a controllable first correlated color temperature. Alternatively or additionally, in specific embodiments the second light generating device may be configured to generate (in an operational mode of the second light generating device) white second device light having a controllable second correlated color temperature.

The term “white light”, and similar terms, herein, is known to the person skilled in the art. It may especially relate to light having a correlated color temperature (CCT) between about 1800 K and 20000 K, such as between 2000 and 20000 K, especially 2700-20000 K, for general lighting especially in the range of about 2000-7000 K, such as in the range of 2700 K and 6500 K. In embodiments, e.g. for backlighting purposes, or for other purposes, the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In specific embodiments, the correlated color temperature (CCT) may be selected from the range of 6000-12000 K, like selected from the range of 7000-12000 K, like at least 8000 K. Yet further, in embodiments the correlated color temperature (CCT) may be selected from the range of 6000-12000 K, like selected from the range of 7000-12000 K, in combination with a CRI of at least 70.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10000 K). Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relatively high blue component in the light source light.

In specific embodiments, the first light generating device may be configured to generate (in an operational mode of the first light generating device) colored first device light having a controllable first color point. Alternatively or additionally, in specific embodiments the second light generating device may be configured to generate (in an operational mode of the second light generating device) colored second device light having a controllable second color point.

Contrast may be created by the difference in luminance from two adjacent surfaces. Contrast may e.g. be defined and determined according to Weber, i.e. $CS=(L_{max}-L_{min})/L_{max}$. In embodiments, during operation of the light generating system in an operational mode the first wall part and the second wall part may have a contrast of less than 10%, as determined according to the definition $(L_{max}-L_{min})/L_{max}$. However, a contrast of equal to or less than 5%, or even equal to or less than 1% may also be possible. When comparing contrasts especially the light leading to the luminances may have essentially the same color point, such as in specific embodiments the same correlated color temperature. Hence, when controlling the first device light and the second device light at essentially the same color point, with the present invention a contrast of 10% or lower, such as 5% or lower, or even 1% or lower may be achieved. For instance, the first device light and the second device light may differ with at maximum 0.03 for u' and/or with at maximum 0.03 for v'. Note, however, that for some applications, e.g. some lighting schemes, a low contrast may be desirable, while for other applications, like other lighting schemes, a higher contrast may be desirable. Hence, especially the radiant fluxes of the first device light and the second device light may be controllable. Further, in embodiments the color point of the first device light and the second device light may be controllable.

Above, the invention has been described in relation to the unit comprising a closed hollow part and an open hollow part. In embodiments, in approximation the wall element at the viewer side may be defined in the order of 20-60% by the open hollow part, and in the order of 30-70% by the closed hollow part.

However, other configurations may also be possible. Especially, in embodiments the unit may comprise two open hollow parts, with a single hollow part configured in between. In yet other embodiments, the unit may comprise a configuration like A(BA)n or B(AB)n, wherein A indicates an open hollow part and B indicates a close hollow part, and n indicates a repetition number, which is at least 1, like selected from the range of 1-100. However, other values are herein not excluded. Especially, herein also the A(BA)n with n=1 is further described in some more detail.

In embodiments, when there are two or more open hollow parts, the dimensions can be different. In embodiments, when there are two or more open hollow parts, the dimensions can be the same.

In embodiments, when there are two or more closed hollow parts, the dimensions can be different. In embodiments, when there are two or more closed hollow parts, the dimensions can be the same.

In embodiments, when there are two or more open hollow parts, the first light generating devices can be different or can be the same.

In embodiments, when there are two or more closed hollow parts, the second light generating devices can be different or can be the same.

In specific embodiments, the unit may comprise in cross-sectional view two open hollow parts, both sharing with the closed hollow part the wall element. As indicated above, the unit may comprise a viewer side. Relative to the viewer side, the open hollow parts are concave, and are configured with the closed hollow part in between. Especially, this may be a symmetrical configuration. Further, the first light generating device(s) in one of the open hollow parts may essentially be the same as the first light generating device(s) in the other one of the open hollow parts.

In embodiments, in operation, the color points and radiant flux of the light emanating from the unit from the first wall parts and from the second wall part may be the same; in other embodiments, however, they may also be different. Hence, when the unit comprises one second wall part and two first wall parts, the color points and radiant flux of the light emanating from the unit from the first wall parts and from the second wall part may be the same; however, in other embodiments, at least two may mutually differ in one or more of radiant fluxes and the color points of the light emanating from the unit.

In embodiments, the two (or more) open hollow parts may be operated different from the closed hollow part, e.g. to emulate the illusion of directional light. Further, in embodiments the two (or more) open hollow parts may be operated individually.

The wall element may be optimized by the shape and contours of the wall element and its surface appearance to the human eye in terms of look and feel. Hence, surface structure and roughness may be optimized. For example, when the surface of the first wall part is smooth and highly diffuse reflective, the illusion of the feel of infinity may arise. When the surface is rougher and textured, the illusion of a space continuing behind the front layer may be created. When the surface of the first wall part would be coarsely textured, the perception of a finish layer that feels natural and familiar may be created. In embodiments, the wall element may comprise an amorphous surface finish. In alternative embodiments, the wall element may comprise slight roughness, e.g. micron to sub-millimeter sized texture/particles and surface undulations. In yet alternative embodiments, the wall element may comprise submillimeter to millimeter sized texture/particles and surface undulations.

In embodiments, the system may comprise two first light generating devices, configured in the respective open hollow parts, wherein the two first light generating devices are individually controllable. In this way, contrast may even better be controlled. Alternatively, time dependent light schemes may (better) be displayed.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In embodiments, the unit may be comprised by a ceiling or be functionally coupled to a ceiling. In embodiments, the unit may be comprised by a wall or be functionally coupled to a wall. In embodiments, the unit may be comprised by a room divider or be functionally coupled to a room divider. Especially, here functionally coupled may at least comprise attached or mechanically connected.

In yet a further aspect, the invention also provides a lamp or a luminaire comprising the light generating system as defined herein. The luminaire may further comprise a housing, optical elements, louvres, etc. etc. . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, a photochemical reactor, and an optical wireless communication device, comprising the light generating system as defined herein. The light generating device may comprise a housing or a carrier, configured to house or support, one or more elements of the light generating system. For instance, in embodiments the light generating device may comprise a housing or a carrier, configured to house or support one or more of the first light generating device, the wall element, and the optional second light generating device.

In yet a further aspect, the invention provides a space comprising a wall and a ceiling, wherein one or more of the wall and the ceiling may comprise an arrangement of a plurality of the units as described herein.

The term "space" may for instance relate to a (part of) hospitality area, such as a restaurant, a hotel, a clinic, or a hospital, etc. . . . The term "space" may also relate to (a part of) an office, a department store, a warehouse, a cinema, a church, a theatre, a library, etc.

However, the term "space" may also relate to (a part of) a working space in a vehicle, such as a cabin of a truck, a cabin of an air plane, a cabin of a vessel (ship), a cabin of a car, a cabin of a crane, a cabin of an engineering vehicle like a tractor, a cabin of a train carriage, etc. The term "space" may also relate to (a part of) a working space, such as an office, a (production) plant, a power plant (like a nuclear power plant, a gas power plant, a coal power plant, etc.), etc. For instance, the term "space" may also relate to a control room, a security room, etc.

Especially, the term "space" may herein refer to an indoor space. In yet other embodiments, the term "space" may also relate to a toilet room or bathroom. In yet other embodiments, the term "space" may also relate to an elevator. In embodiments, the term "space" may also refer to a conference room, a school room, an indoor hallway, an indoor corridor, an indoor space in an elderly home, an indoor space in a nursing home, etc. In embodiments, the term "space" may refer to an indoor sport space, like a gym, a gymnastics hall, in indoor ball sport space, a ballet room, a swimming pool, a changing room, etc. In embodiments, the term "space" may refer to an (indoor) bar, an (indoor) disco, etc. In specific embodiments, a space may be created by a floor and plurality of units forming one or more walls and a ceiling.

With the present invention, visual effects may be created with a unit that may be relatively thin, like at maximum 20 cm, though at maximum 10 cm may also be achieved, like in the range of 5-10 cm. This allows substantial downscaling and allows all kinds of applications in relative narrow spaces. However, the unit can also be upscaled, allowing all kinds of applications in relatively large spaces.

According to a first aspect, the invention provides a method for manufacturing the light generating system according to claim 13.

BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 1A:
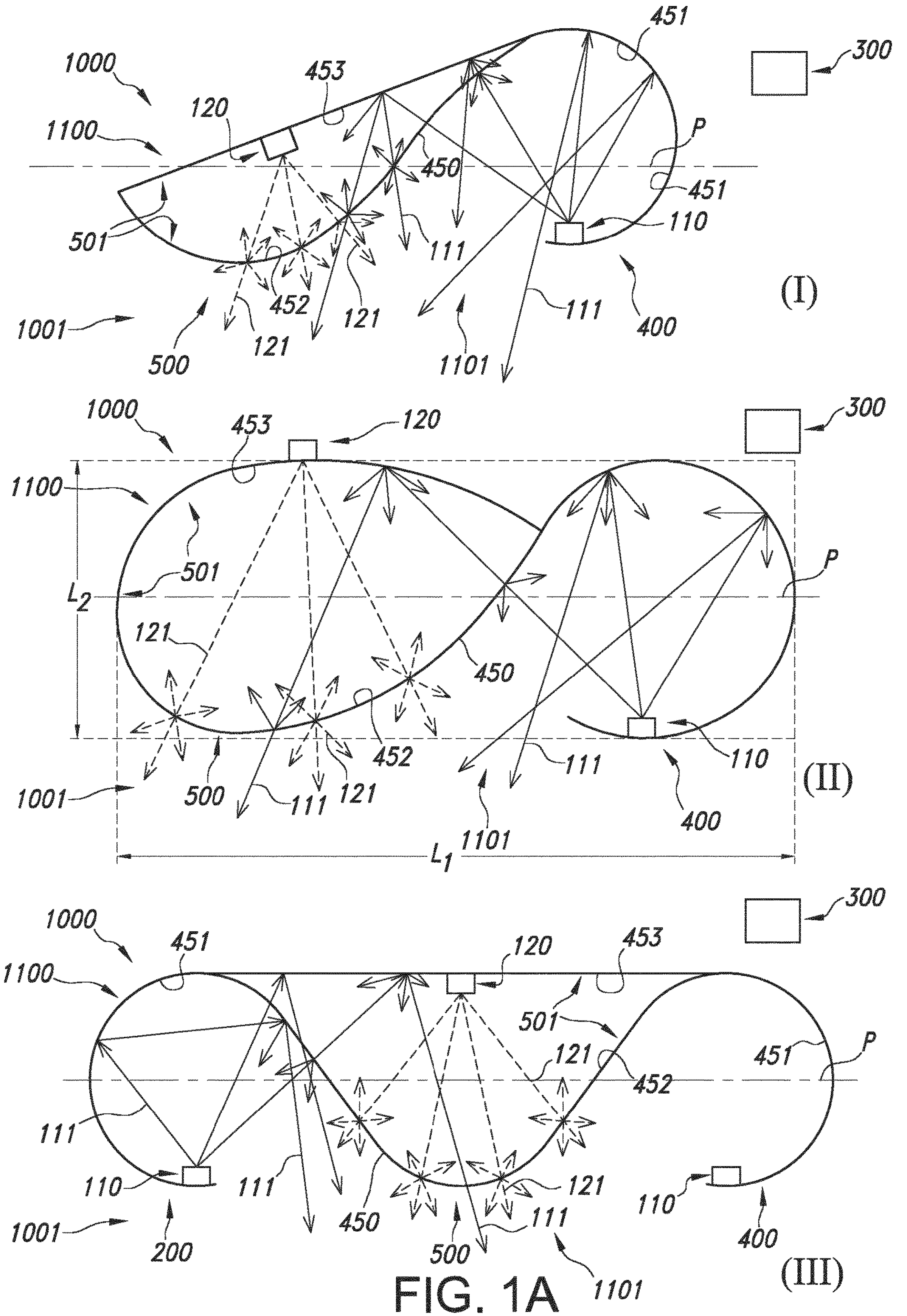
FIGS. 1*a*-1*b* schematically depicts three embodiments, though other embodiments within the scope of the claims may also be possible.

The schematic drawings are not necessarily to scale.

DETAILED DESCRIPTION OF THE EMBODIMENTS

Amongst others, in this invention it is proposed to improve upon the optical efficiency of an optical cavity by closing the bottom portion of an indirectly lit concave cavity. Further, amongst others, herein it is proposed to improve upon the contrast sensitivity of the system by executing an opaque, reflective and convex portion of a shaped element, especially an S-shape element, as a translucent, convex, optical cavity which may at least be passively lit by the stray light emerging from the indirectly lit concave cavity. Further, amongst others, herein it is proposed that the translucent convex cavity may be illuminated from within, by direct illumination of the translucent light exit window, for example, such that the contrast sensitivity of the convex and concave portions can be controlled independently from each other, and which may in specific embodiments be adjusted at will over a range unobtainable by conventional means. Especially, in embodiments because of an independent control over both optical cavities, both up and/or downscaling may be possible without a substantial burden of unacceptable contrast modulation, thereby meeting space restrictions behind the ceiling as demanded/required and serving the contrast sensitivity needs of various age groups.

In embodiments, the system may comprise a curved, diffuse reflective element, with its outer contour shaped like that of a leaf having a curled stem portion (see embodiments I and II of FIG. 1*a*), but not limited to such shape. The system may comprise an S-shaped diffusive translucent element. Especially, this element may be aligned towards said curved, diffuse reflective element, to form a soft-curved light exit window, with the light exit window seamlessly integrating a concave and a convex optical cavity. In embodiments, at least a first light-engine (i.e. first light generating device), preferably illuminates the concave portion of the S-shaped assembly indirectly, i.e. the stem portion, such that said translucent convex optical cavity is lit passively, thereby already improving upon the contrast sensitivity. Further, in specific embodiments at least a second light engine (i.e. second light generating device), may illuminate the translucent cavity from within. In specific embodiments, such second light engine may be controlled independent from said first light engine, such that said contrast sensitivity of the curved light exit window can be controlled dynamically and adjusted at will. This may further facilitate up and down scaling of the unit size. The system may further comprise a lighting controller, especially controlling said first and said second light engine. For example, a device that is more acceptable than a flat panel device mounted to a wall to bring melanopic light horizontally into the human eye. For instance, in specific embodiments only a part of the viewer surface may serve the melanopic proposition. For example, the bottom portion of the device surface for a wall arrangement may emulate a surface state at the earth surface, and the upper portion that of a horizon and/or a sky portion, with the sky portion providing melanopic enhanced light (i.e. reducing melatonin generation).

FIG. 1*a* schematically depicts a light generating system 1000 comprising a first light generating device 110 and a unit 1100. The first light generating device 110 may be configured to provide first device light 111 having a wavelength in the visible wavelength range. Especially, the unit 1100 may comprise in cross-sectional view an open hollow part 400 and a closed hollow part 500. Further, the unit 1100 may comprise a viewer side 1101. Especially, relative to the viewer side 1101, the open hollow part 400 may be concave. The open hollow part 400 may comprise a first wall part 451. The first wall part 451 may be diffuse reflective for the first device light 111. The closed hollow part 500 may comprise a chamber wall 501 comprising (a) a second wall part 452. The second wall part 452 may be translucent for the first device light 111, and (b) a chamber wall part 453. The chamber wall part 453 may be diffuse reflective for the first device light 111. The unit 1100 may comprise a wall element 450 comprising the first wall part 451 and the second wall part 452. Especially, the first light generating device 110 may be configured in the open hollow part 400. In embodiments, the first light generating device 110 may be configured to irradiate (i) at least part of the first wall part 451 and (ii) at least part of the second wall part 452. Further, the unit 1100 and the first light generating device 110 may be configured such that first device light 111 does (substantially) not directly escape from the viewer side 1101. The closed hollow part 500 may be configured such that at least part of the first device light 111 entering the closed hollow part 500 via the second wall part 452 also escapes via the second wall part 452.

The first light generating device, or one or more of the first light generating devices may comprise a LED. Besides discrete LEDs, also filaments LEDs, linear COBs covered with a phosphor line, or different alternating phosphor portions may also be used as solid state lighting (SSL) sources. Others SSL, such as (flexible) light lines of OLEDs, may also be used. Also a side coupled linear lightguide (light rod) may be used as a light source. The same holds for small diameter gas discharge tubes. Optionally, the first light generating device or the second light generating device may also comprise a light source configured to generate radiation other than visible light. Especially the indirect lit cavity of first light may be suitable for the integration of UV-B LEDs (vitamin D) or in general for wavelengths having difficulties to pass the materials of the traditional light exit windows sufficiently.

As can be derived from the drawings, in embodiments the wall element 450 may have a wave-like shape. In embodiments, the first wall part 451 may be curved, or may comprise more than three facets, or may comprise a curved part and one or more facets. Here, only curved wall elements 450 are schematically depicted. Further, the second wall part 452 may be curved, or may comprise more than three facets, or may comprise a curved part and one or more facets. The surface may be smooth or rough/textured to serve different use cases, see also above.

In embodiments, the first light generating device 110 may be controllable. Especially, the first device light 111 may be controllable with respect to one or more of color point and radiant flux. Yet, in embodiments the light generating system 1000 may further comprise a control system 300 configured to control the first light generating device 110.

Especially, the first wall part 451, assuming perpendicular irradiation with the first device light 111, may be configured to reflect at least 35% of the first device light 111, more especially at least 75%, such as at least about 80%, like at least about 90% of the first device light 111.

In embodiments, the second wall part 452 and the first wall part 451 may have essentially the same optical properties. In such embodiments, it may be useful to have a highly reflective element downstream of at least part of the first wall part. Hence, downstream of at least part of the first wall part, a reflector may be configured, such as a reflective layer. The downstream configured reflector may be configured to reflect at least 80%, more especially at least 85% of the first device light 111, even more especially at least about 90% of the first device light 111, assuming perpendicular irradiation with the first device light 111. Alternatively or additionally, the downstream configured reflector may be configured to reflect at least 80%, more especially at least 85% of the second device light 121, even more especially at least about 90% of the first second device light 121, assuming perpendicular irradiation with the second device light 121.

In embodiments, the second wall part 452, assuming perpendicular irradiation with the first device light 111, may be configured to forward transmit 60-95% of the first device light 111.

Yet, in embodiments the chamber wall part 453, assuming perpendicular irradiation with the first device light 111, may be configured to reflect at least 35% of the first device light 111, more especially at least 75%, such as at least about 80%, like at least about 90% of the first device light 111.

In embodiments, the second wall part 452 and the chamber wall part 453 may have essentially the same optical properties. In such embodiments, it may be useful to have a highly reflective element downstream of the chamber wall part. Hence, downstream of the chamber wall part, a reflector may be configured, such as a reflective layer. The downstream configured reflector may be configured to reflect at least 80%, more especially at least 85% of the first device light 111, even more especially at least about 90% of the first device light 111, assuming perpendicular irradiation with the first device light 111. Alternatively or additionally, the downstream configured reflector may be configured to reflect at least 80%, more especially at least 85% of the second device light 121, even more especially at least about 90% of the first second device light 121, assuming perpendicular irradiation with the second device light 121.

As schematically depicted, in embodiments the light generating system 1000 may further comprise a second light generating device 120 configured to provide second device light 121 in the closed hollow part 500. The second device light 121 may have a wavelength in the visible wavelength range.

Especially, the second wall part 452 may be translucent for the second device light 121. In embodiments, the unit 1100 and the second light generating device 120 may be configured such that second light generating device 120 in the off-state may not be visible with the human eye for a human user from the viewer side 1101. In embodiments, the second light generating device 120 may be configured within the closed hollow part 500. Further, in embodiments the chamber wall part 453 may be diffuse reflective for the second device light 121. Especially, in embodiments the second wall part 452, assuming perpendicular irradiation with the second device light 121, may be configured to forward transmit 60-95% of the second device light 121. Yet, in embodiments the chamber wall part 453, assuming perpendicular irradiation with the second device light 121, may be configured to reflect at least 35% of the second device light 121, more especially at least 75%, such as at least about 80%, like at least about 90% of the second device light 121. The second light generating device 120 may in embodiments be controllable. Especially, the second device light 121 may be controllable with respect to one or more of color point and radiant flux. The control system 300 may be configured to control the second light generating device 120.

In specific embodiments, the light generating system 1000 may be configured to provide in an operational mode of the light generating system 1000 first device light 111 and second device light 121 having color points that differ at maximum 0.03 for u' and/or at maximum 0.03 for v'. The first light generating device 110 may be configured to generate white first device light 111 having a controllable first correlated color temperature. Further, in embodiments the second light generating device 120 may be configured to generate white second device light 121 having a controllable second correlated color temperature.

In embodiments, during operation of the light generating system 1000 in an operational mode the first wall part 451 and the second wall part 452 have a contrast of less than 10%, as determined according to the definition $(L_{max}-L_{min})/L_{max}$.

Amongst other referring to embodiments III of FIG. 1*a*, the unit 1100 may comprise in cross-sectional view two open hollow parts 400, both sharing with the closed hollow part 500 the wall element 450. The unit 1100 may comprise a viewer side 1101. Relative to the viewer side 1101, in embodiments the open hollow parts 400 are concave, and are configured with the closed hollow part 500 in between. The closed hollow part may be convex.

Referring to FIG. 1*a*, reference P indicates a cross-sectional plane. Assuming such cross-sectional plane P of the unit 1100, an area of the first wall part 451 and the second wall part 452 (at the viewer side) may be larger than an area of the cross-sectional plane.

In embodiments, the unit 1100 may be enclosed by a virtual smallest rectangular parallelepiped (i.e. a virtual rectangular parallelepiped with the smallest volume that encloses the unit 1100). The main and minor axes are defined perpendicular to the faces of the rectangular parallelepiped, the longest dimension having a longest dimension length (L1), a minor axis with a minor axis length (L2) and another or further (orthogonal axis) having a further axis length (L3). Hence, the longest dimension may especially relate to a length of the unit 1100, the minor axis may especially relate to a thickness or height of the unit 1100, and the further axis may especially refer to a width of the unit 1100.

Especially, L1>L2, further, especially L3>L2. The ratios given herein for L1/L2 may also apply to a ratio of L3/L2. L1 and L3 may be the same or may differ, but are in specific embodiments each individually especially at least 2 times larger than L2, such as at least 5 times larger than L2. Further, the dimensions herein given for the longest dimension length may thus also apply for the length of the further axis, though—as indicated above—the length of these axis may be chosen individually. With the definition of the virtual) rectangular parallelepiped, and the herein indicated dimensions, essentially flat particles, like flakes, are defined.

In embodiments, an accumulated area of the first wall part 451 and the second wall part 452 is larger than L1*L3, such as at least 1.2*L1*L3.

Figure 1B:
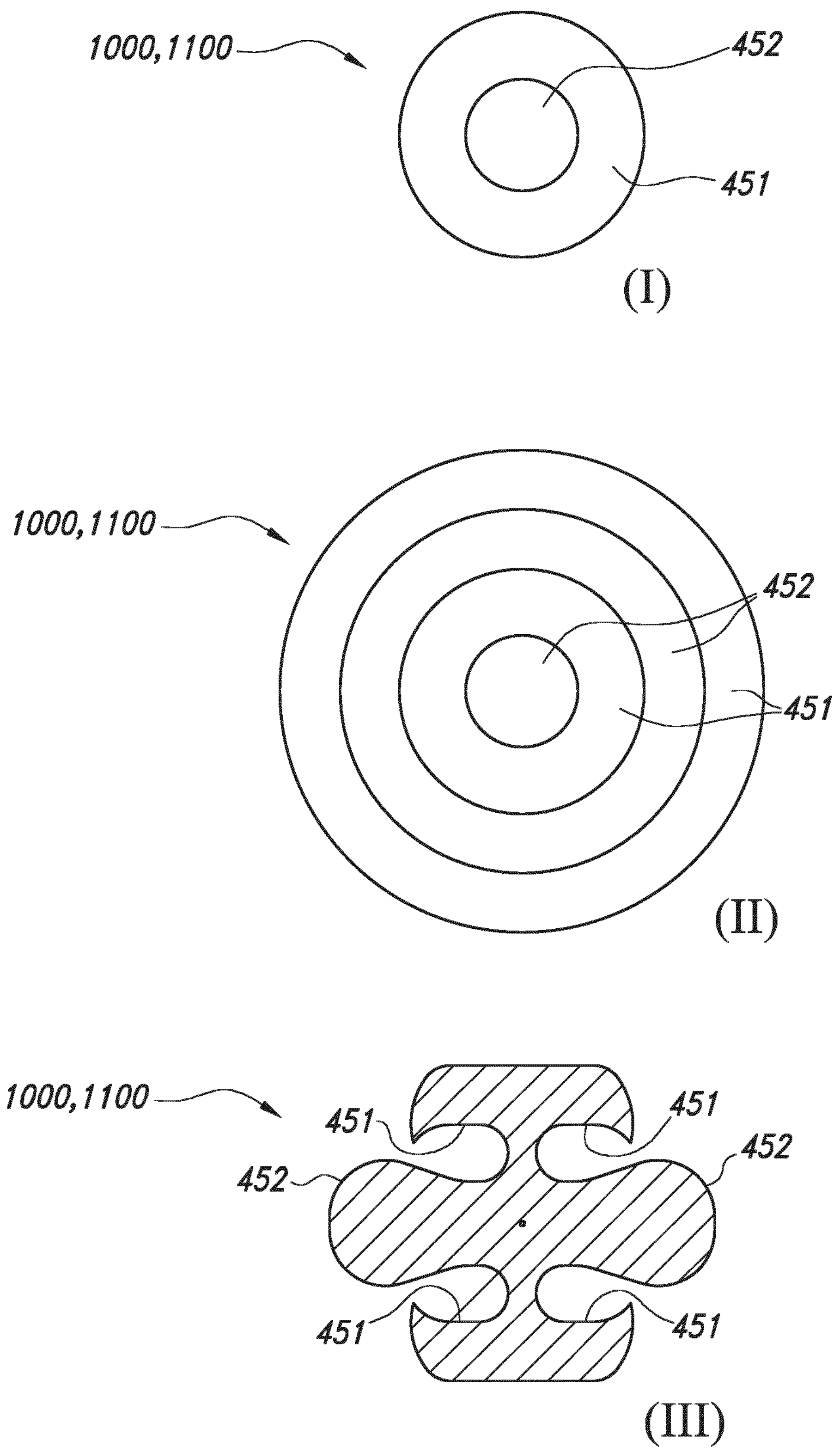

For describing FIG. 1*b*, it is first referred to FIG. 1*a*. For instance, embodiments I and II may be rotated around an axis. Schematically a kind of top view or bottom view of such embodiments is depicted in embodiment I in FIG. 1*b*. This may be essentially the same as rotating embodiment III of FIG. 1*a* around a central axis. Referring to embodiment II of FIG. 1*b*, a second closed hollow space and a second open hollow space are added. Again, this is shown very schematically. Embodiment III schematically shows a cross-sectional view of a kind of pillar, comprising one or more units.

Figure 2:
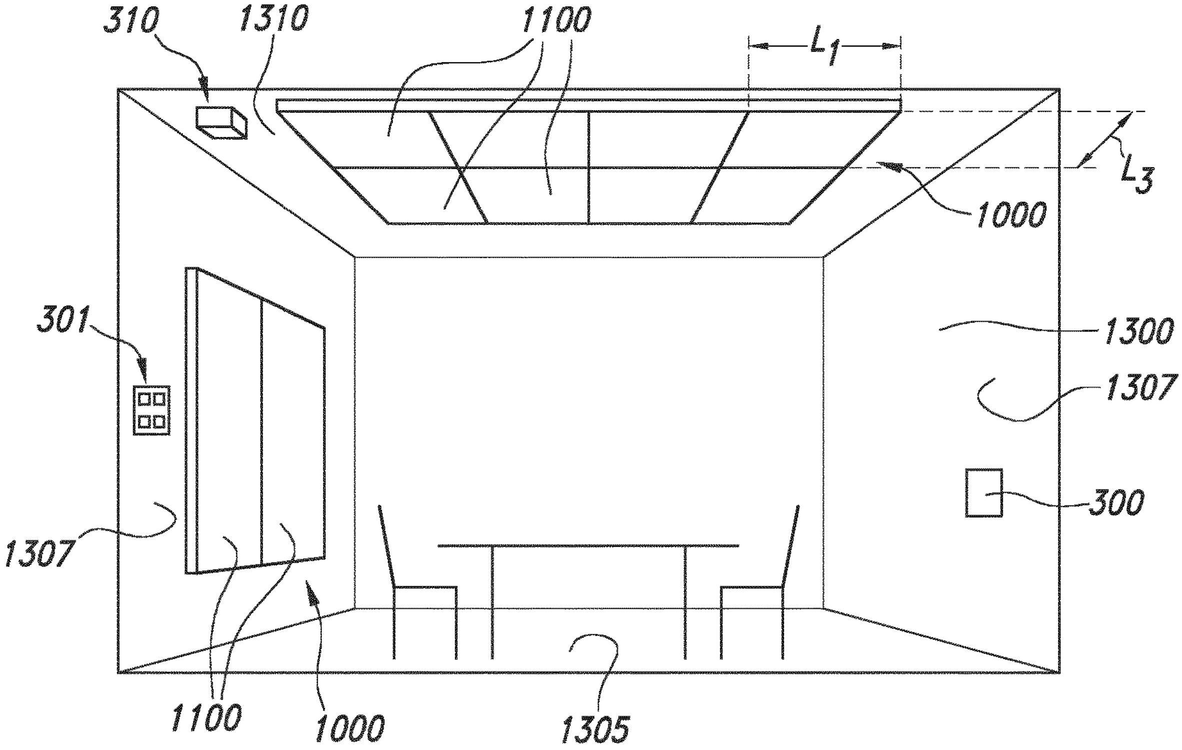
FIG. 2 schematically depicts some possible applications.

Referring to FIG. 2, the unit 1100 may be a modular unit 1100. Reference 1300 refers to a space, such as a room. Reference 1305 refers to a floor; reference 1307 refers to a wall, and reference 1310 refers to a ceiling. Hence, a space 1300 comprising a wall 1307 and a ceiling 1310. One or more of the wall 1307 and the ceiling 1310 may comprise an arrangement of a plurality of the units 1100 according to any one of the preceding claims 1-13. Reference 301 refers to a user interface. The user interface 301 may be functionally coupled to a control system 300.

In embodiments, one or more walls may be provided by units 1100. In embodiments, essentially the entire ceiling may be provided with one or more units 1100.

Referring to embodiment III of FIG. 1*a*, some further embodiments are described. The shape of the optical cavities may be alternatingly concave and convex. When the cavities are executed symmetrically, the element of time can be provided, in that for example as time moves along, light starts to emerge from the left cavity in the morning, moving towards the center cavity at midday, to light all three cavities at midday, and finally moving towards the right cavity to emerge substantially from the right cavity at late noon, early evening.

The structures of the cavities may also be wrapped around one of their axis, to yield an in-plane circular arrangement, or around the Z-axis, to yield a column shaped light exit window. Additionally or alternatively, even torqued light exit windows (spiraled) may be possible using 3D printing techniques.

Referring to FIG. 1*a*. a plurality of cavities may be arranged to form a larger sized lighting device. However, the size and shape of each of the units building the plurality of cavities does not need to be identical in that a mix of scaled up and down versions may be combined to form a light exit window that is richer in user experience.

In embodiments the CCT of the first and second light engine may be the same and light intensity controlled to yield a uniformly lit light exit window.

In embodiments first and second light-engines can also be tunable white light engines. When the tunable white engines are controlled independently, a wide variety in light scenes can be enabled. For example, when the first cavity is set to emit colder white light, and the second cavity set to emit warmer white light, the illusion of an open façade behind the viewer observation surface can be created. Or in another example, when the device is applied as a ceiling lighting device, that of a blue sky. Even the illusion of a dark sky may be created at night in deep dimming the light intensity of the first cavity. Furthermore, surreal light scenes can be created.

In embodiments, the CCT of each of a plurality of cavities may be controlled independent for both first and second cavities. Thus the CCT of the suggested outdoor light, emitted by the first cavities, may follow a circadian rhythm throughout the day, whereas the second cavities may be operated in static. Alternatively, the second cavities may be operated to emit a circadian rhythm, whereas the first cavities may be operated in static. More preferably, both first and second cavities may be operated following a circadian rhythm to emulate progress of a day both in light intensity and CCT.

Rather than operating the whole of the light exit window uniformly, it may be understood that only a portion of the light exit window may be dynamic, e.g. to create the illusion of a skylight.

In embodiments the color and light gradient of the natural sky may also be emulated in that a (comparable) color and light gradient may be present across the observation surface of the light device. This gradient may be present and identical for first and second cavities, or it may be different, or even opposite for first and second cavities.

In embodiments, the tunable white engines may be pixelated light-engines for either one or both optical cavities. Thus, a very realistic illusion of moving tree leaves, clouds passing over, or gusts of wind can be emulated without the need for an actual image.

Additionally or alternatively, the far field light emissions may be tuned such that hardly any light fluctuation occurs, for example at the working surfaces of office spaces.

In embodiments rapid changes may be brought about at the working surfaces of office spaces to temporarily distract employees on purpose such that they briefly look directly into a light engine providing a melanopic boost. Variations on the theme may be obvious in that the effect may occur in 360 degrees around an employee, such that an office worker is triggered to move and/or turn his/her head as well.

An embodiment of a method for manufacturing a light generating system (1000) according to the invention comprises the following steps:

(a) providing a first curved and diffuse reflective element comprising the chamber wall (501) and an extension part that is at least partly conformal with the first wall part (451), wherein the extension part comprises the first light generating device (110);

(b) providing a second curved element comprising the first wall part (451) and the second wall part (452);

(c) connecting the first element at an end portion the chamber wall (501) with the second curved element at an end portion of the second wall part (452) via a clamping mechanism;

(d) connecting the first element at an end portion of the extension part with the second element at an end portion of the first wall part (451) via a clamping mechanism.

The steps (a)-(d) do not have to be performed in this specific order. In an embodiment of the method for manufacturing a lighting system according to the invention, the clamping mechanism comprises an opening in one end portion and a matching protrusion in the other end portion. In an embodiment, the first element further comprises the second light generating device (120). In an embodiment, the first and second light generating devices (110, 120) have end caps for accommodating electrically conductive wires for providing power to the light generating device and optionally for further controlling the light generating device. In an embodiment of the method, the steps (a)-(d) are repeated such that the required dimension of the light generating system (1000) is obtained. In an embodiment, the first curved and diffuse reflective element is mounted to a rigid carrier material before it is connected to the second curved element. The first and second elements may be manufactured using a polymer extrusion process. The dimensions of the first and second element may be varied depending on the requirements of the light generating system. For example, in case of a light generating system of 60×60 cm, the dimensions of the first and second elements may be 15×15 cm or 20×20 cm.

The above are mere examples of the wide variety in light scene emulations possible. More examples, not mentioned here, might also be imaginable for the skilled person.

The term “plurality” refers to two or more.

The terms “substantially” or “essentially” herein, and similar terms, will be understood by the person skilled in the art. The terms “substantially” or “essentially” may also include embodiments with “entirely”, “completely”, “all”, etc. Hence, in embodiments the adjective substantially or essentially may also be removed. Where applicable, the term “substantially” or the term “essentially” may also relate to 90% or higher, such as 95% or higher, especially 99% or higher, even more especially 99.5% or higher, including 100%.

The term “comprise” also includes embodiments wherein the term “comprises” means “consists of”.

The term “and/or” especially relates to one or more of the items mentioned before and after “and/or”. For instance, a phrase “item 1 and/or item 2” and similar phrases may relate to one or more of item 1 and item 2. The term “comprising” may in an embodiment refer to “consisting of” but may in another embodiment also refer to “containing at least the defined species and optionally one or more other species”.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising a first light generating device and a unit, wherein:

- the first light generating device is configured to provide first device light having a wavelength in the visible wavelength range;
- the unit comprises in cross-sectional view an open hollow part and a closed hollow part; wherein the unit comprises a viewer side; wherein relative to the viewer side, the open hollow part is concave;
- the open hollow part-comprises a first wall part; wherein the first wall part is diffuse reflective for the first device light;
- the closed hollow part comprises a chamber wall comprising a second wall part, wherein the second wall part is translucent for the first device light, and a chamber wall part, wherein the chamber wall part is diffuse reflective for the first device light;
- the unit comprises a wall element comprising the first wall part and the second wall part;
- the first light generating device is configured in the open hollow part;
- wherein the first light generating device is configured to irradiate at least part of the first wall part and at least part of the second wall part; and
- the unit and the first light generating device are configured such that first device light does not directly escape from the viewer side; and wherein the closed hollow part is configured such that at least part of the first device light entering the closed hollow part via the second wall part also escapes via the second wall part.

2. The light generating system according to claim 1, wherein the wall element has a wave-like shape.

3. The light generating system according to claim 1, wherein the first wall part is curved, or comprises more than three facets, or comprises a curved part and one or more facets, and wherein the second wall part is curved, or comprises more than three facets, or comprises a curved part and one or more facets.

4. The light generating system according to claim 1, wherein the first light generating device is controllable and wherein the first device light is controllable with respect to one or more of color point and radiant flux; wherein the light generating system further comprises a control system configured to control the first light generating device.

5. The light generating system according to claim 1, wherein: the second wall part, assuming perpendicular irradiation with the first device light, is configured to forward transmit 60-95% of the first device light; and wherein the chamber wall part, assuming perpendicular irradiation with the first device light, is configured to reflect at least 90% of the first device light.

6. The light generating system according to claim 1, further comprising a second light generating device configured to provide second device light in the closed hollow part, wherein the second device light has a wavelength in the visible wavelength range, wherein the second wall part-is translucent for the second device light; and wherein the unit and the second light generating device are configured such that second light generating device in the off-state is not visible with the human eye for a human user from the viewer side.

7. The light generating system according to claim 6, wherein the second light generating device is configured within the closed hollow part, and wherein the chamber wall part is diffuse reflective for the second device light.

8. The light generating system according to claim 6, wherein: the second wall part, assuming perpendicular irradiation with the second device light, is configured to forward transmit 60-95% of the first device light.

9. The light generating system according to claim 6, wherein the second light generating device is controllable and wherein the second device light is controllable with respect to one or more of color point and radiant flux; wherein the control system is configured to control the second light generating device.

10. The light generating system according to claim 6, wherein the light generating system is configured to provide in an operational mode of the light generating system first device light and second device light having color points that differ at maximum 0.03 for u' and/or at maximum 0.03 for v'.

11. The light generating system according to claim 6, wherein the first light generating device is configured to generate white first device light having a controllable first correlated color temperature, and wherein the second light generating device is configured to generate white second device light having a controllable second correlated color temperature.

12. The light generating system according to claim 1, wherein the unit comprises in cross-sectional view two open hollow parts, both sharing with the closed hollow part the wall element; wherein the unit comprises a viewer side; wherein relative to the viewer side, the open hollow parts are concave, and are configured with the closed hollow part in between.

13. A lighting device selected from the group of a lamp, a luminaire, and an optical wireless communication device, comprising the light generating system according to claim 1.

14. A space comprising a wall and a ceiling, wherein one or more of the wall and the ceiling comprises an arrangement of a plurality of the light generating system according to claim 1.

15. A method for manufacturing a light generating system comprising a first light generating device and a unit, wherein: the first light generating device is configured to provide first device light having a wavelength in the visible wavelength range, the unit comprises in cross-sectional view an open hollow part and a closed hollow part; wherein the unit comprises a viewer side; wherein relative to the viewer side, the open hollow part is concave, the open hollow part comprises a first wall part; wherein the first wall part is diffuse reflective for the first device light, the closed hollow part comprises a chamber wall comprising (a) a second wall part, wherein the second wall part is translucent for the first device light, and (b) a chamber wall part, wherein the chamber wall part is diffuse reflective for the first device light, the unit comprises a wall element comprising the first wall part and the second wall part, the first light generating device is configured in the open hollow part; wherein the first light generating device is configured to irradiate (i) at least part of the first wall part and (ii) at least part of the second wall part; and the unit and the first light generating device are configured such that first device light does not directly escape from the viewer side; and wherein the closed hollow part is configured such that at least part of the first device light entering the closed hollow part via the second wall part also escapes via the second wall part, the method comprising:

(a) providing a first curved and diffuse reflective element comprising the chamber wall and an extension part that is at least partly conformal with the first wall part, wherein the extension part comprises the first light generating device;
(b) providing a second curved element comprising the first wall part and the second wall part;
(c) connecting the first element at an end portion of the chamber wall with the second curved element at an end portion of the second wall part via a clamping mechanism; and
(d) connecting the first element at an end portion of the extension part with the second element at an end portion of the first wall part via a clamping mechanism.

* * * * *